Sept. 28, 1948.  C. D. PETERSON ET AL  2,450,056
TRANSMISSION MECHANISM

Original Filed Sept. 29, 1943  2 Sheets-Sheet 1

INVENTORS:
Carl D. Peterson &
Albert H. Deimel,
BY
ATTORNEYS.

Sept. 28, 1948.　　　C. D. PETERSON ET AL　　　2,450,056
TRANSMISSION MECHANISM

Original Filed Sept. 29, 1943　　　　　　2 Sheets-Sheet 2

INVENTORS:
Carl D. Peterson &
Albert H. Deimel,
BY
Bodell & Thompson
ATTORNEYS.

Patented Sept. 28, 1948

2,450,056

UNITED STATES PATENT OFFICE 2,450,056

TRANSMISSION MECHANISM

Carl D. Peterson and Albert H. Deimel, Toledo, Ohio, assignors to Dana Corporation, Toledo, Ohio, a corporation of Virginia Application September 29, 1943, Serial No. 504,231, which is a division of application Serial No. 497,839, August 7, 1943. Divided and this application December 2, 1944, Serial No. 566,272

6 Claims. (Cl. 74—333)

1

This invention relates to transmission mechanisms and has for its object an indirect drive or countershaft drive in a transmission mechanism, wherein a driven shaft is actuated at a high speed through a direct drive shaft from the engine and at intermediate speeds through a drive shaft actuated by the engine through a hydraulic torque converter with the two drive shafts arranged concentric and axially alined with the driven shaft, and more specifically, it has for its object a countershaft mechanism including overrunning clutches between the countershaft and the driven shaft and between the converter shaft and the driven shaft to permit overrunning of the driven shaft when in direct drive and the converter shaft is stationary or idling.

Other minor features will appear throughout the specification.

This case is a division of the application of Carl D. Peterson and Albert H. Deimel, Serial Number 504,231 filed September 29, 1943, which in turn is a division of application Serial Number 497,839, filed August 7, 1943 and which have eventuated in Patent No. 2,397,883 dated April 2, 1946, and Patent No. 2,399,568 dated April 30, 1946.

In describing this invention, reference is had to the accompanying drawings in which like characters designate corresponding parts in all the views.

Figure 1:
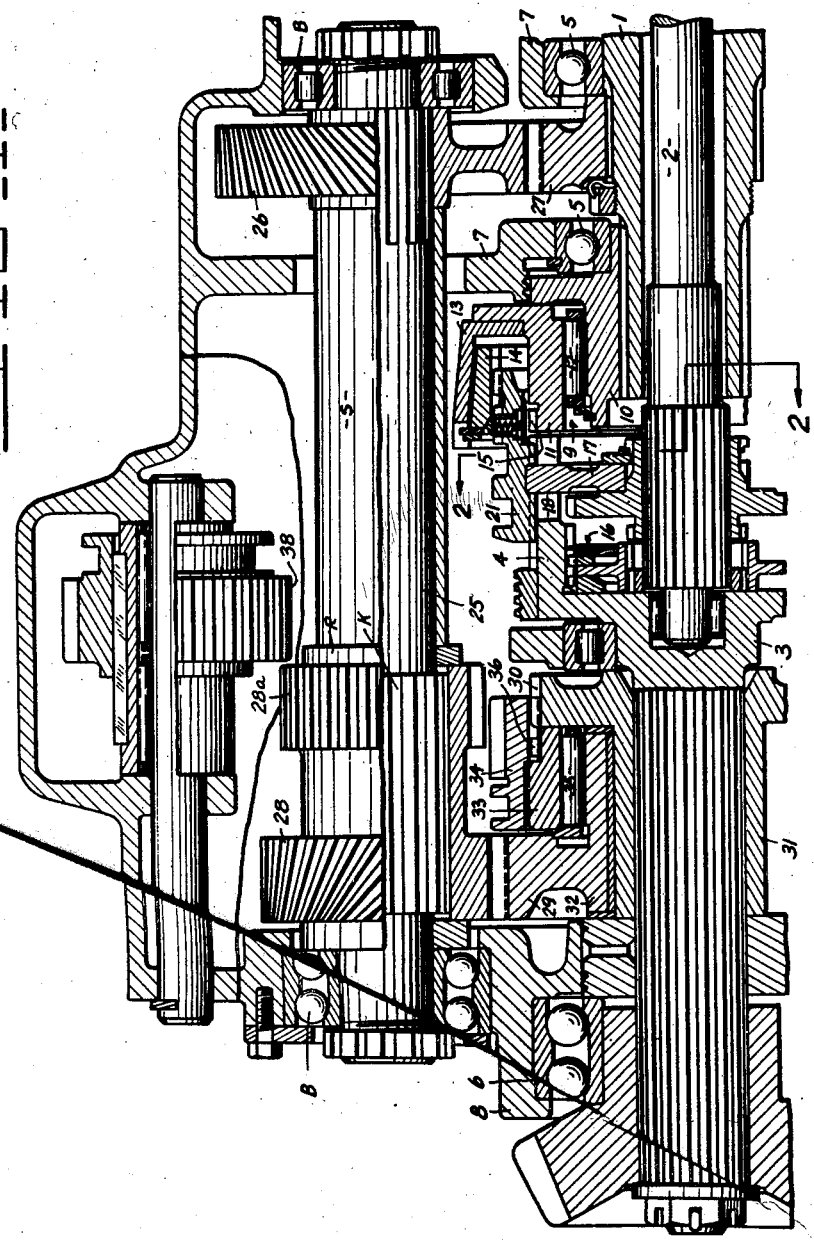
Figure 1 is a fragmentary longitudinal sectional view of a transmission gearing embodying this invention.

1 and 2 designate the driving shafts of the transmission and 3 the driven shaft, the shafts 1, 2 being arranged concentric. The shaft 1 may be actuated from the engine through a torque converter and is usually an elongation of the hub of the runner of a hydraulic torque converter. The shaft 2 is actuated directly from the engine. The driven shaft 3 is spaced axially from the shafts 1, 2 and is here shown as having a cylindrical head 4 enclosing the space between the drive shafts 1, 2 and the driven shaft 3. The drive shafts 1, 2 and the driven shaft 3 are journalled in suitable bearings 5, 6 in the walls 7, 8 of a gear box. As the drives from the outer or converter shaft 1 are intermediate drives, the driven shaft 3 or the head 4 thereof is driven through an overrunning clutch designated generally 9. This includes an inner race or cam 10 mounted on and rotatable with the converter

2 shaft 1 and outer race 11 and rollers 12 between them. The intermediate drives are effected through a synchronizing clutch including a friction section 13 rotatable with the outer race 11, a friction section 14 rotatable with the driven shaft or head 4, and a jaw or toothed face 15 on the outer race coacting with teeth on a clutch collar 21. The direct drive from the drive shaft 2 is effected through a balking ring clutch designated generally 16. The balking ring clutch is operable alternately with the synchronizing clutch, as by an annular fork 17 working in a suitable groove in the hub of the shiftable section of the balking ring clutch and having radially extending posts or arms extending through lengthwise slots 18 in the head 4 and seating at their ends in depressions in the clutch collar 21. The clutch collar is thus common to the synchronizing clutch and the balking ring clutch, so that the synchronizing clutch is engaged, when the collar 21 is shifted to the right from central position, and the balking ring clutch engaged when the collar is shifted to the left. As the operation of synchronizing clutches and balking ring clutches is well understood, and as the construction per se of the clutches forms no part of this invention, further description of the same is thought to be unnecessary. For similar constructions of synchronizing and balking ring clutches, see Peterson and Deimel Patents Nos. 2,378,788 dated June 19, 1945 and 2,363,746 dated November 28, 1944. The clutch collar 21 is shifted by means of a suitable fork operable in any suitable manner.

Figure 2:
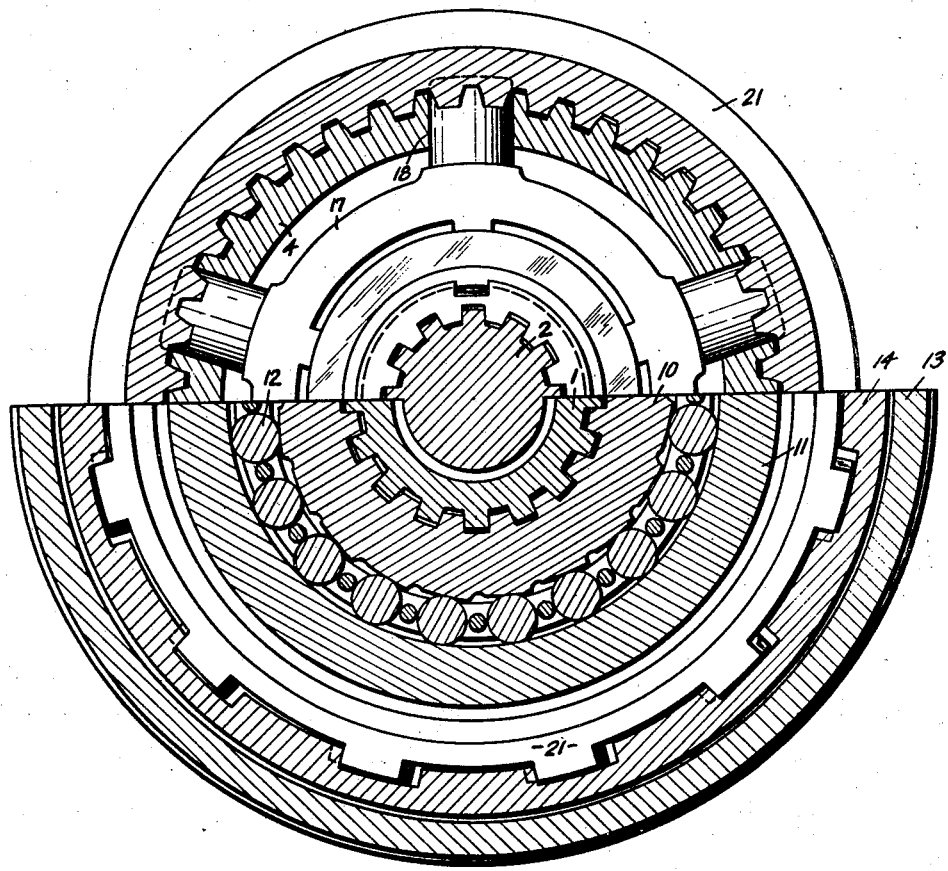
Figure 2 is an enlarged sectional view on line 2—2, Figure 1.

The drive through the countershaft is primarily to produce low speed forward and reverse. The countershaft drive includes a countershaft 25 suitably journalled in the gear box extending parallel to the axes of the drive shafts 1, 2 and the driven shaft 3 across the head 4, a gear 26 mounted on one end of the countershaft and meshing with the gear 27 on the outer drive or converter shaft 1, a gear 28 on the other end of the countershaft 25 and meshing with the gear 29 concentric with the driven shaft 3, a clutch gear 30 splined on the driven shaft 3 in the rear of the head 4 and having an elongated hub 31 on the shaft 3, on which hub 31 the hub 32 of the gear 29 is rotatably mounted, and clutch means between the gear 29 and the gear 30 here shown as including an overrunning clutch between the hub 31 and an outer race 33 and a clutch collar 34. The hub 32 constitutes the inner race or cam of the overrunning clutch and 33 the outer race. 35 designates the roller between the two raceways. The clutch collar 34 has internal splines, which normally engage external teeth 36 on the outer race 33 and the peripheral teeth of the clutch gear 30. This clutch collar is shiftable so as to engage or interlock exclusively with the clutch gear 30. It may be shifted in any suitable manner. The clutch collar 34 is provided with external gear teeth, which mesh with a reverse idler 38, when the collar 34 is shifted into exclusive engagement with the clutch gear 30 and out of engagement with the outer race 33. The idler 38 is shiftable into mesh with a gear 28a on the countershaft with the gear teeth on the collar 34. The collar 34 and the idler 38 are shifted by any suitable shifting mechanism, which operates them simultaneously. Owing to the overrunning clutch, which includes the rollers 35, the driven shaft 3 can overrun the indirect drive, when the shaft 2 is being driven through the balking ring clutch. In all normal speeds, except reverse, the clutch collar 34 is in the position shown in Figure 1. The overrunning clutches may be of any suitable construction, that here shown in Figure 2 as including rollers 12 and illustrative of that including the rollers 35.

As here shown, the countershaft is mounted in suitable bearings B in opposite walls of the gear box. The gear 26 is splined on the countershaft and the gears 28 and 28a are unitary in the form of a cluster or spool splined or keyed to the countershaft at K, and there is a spacing sleeve S around the countershaft 25 and thrusting at one end against the hub of the gear 26 at its other end against one side of a lock ring R on the shaft 25, against the opposite side of which the gear 28a abuts. The outer or right end of the gear 26 thrusts against one bearing B and the outer or left end of the hub of the gear 28 thrusts against the other bearing B. This specific construction per se forms no part of the invention.

In operation, when the clutch collar 21 is in neutral position, when both the synchronizing clutch and the balking ring clutch are disengaged, the drive is through the countershaft 25 and by shifting the clutch collar 34 and the idler 38 so that the latter meshes with the countershaft gear 28a and fully with the gear teeth of the clutch collar 34, reverse speed will be obtained. When the collar 34 is in normal or low speed position, and the synchronizing clutch is shifted into engaged position, the driven shaft 2 can overrun through the overrunning clutch, which includes the rollers 35. When the clutch collar 21 is shifted to engage the balking ring clutch and connect the high speed drive shaft 2 and the driven shaft 3 together, the driven shaft 3 or its head 4 can overrun the converter shaft 1 through the overrunning clutch, which includes the rollers 12, so that the converter remains idle. The same overrunning effect can take place, if the converter is being actuated. However, as it will be understood and as shown in application Serial Number 497,839, the converter is disconnected by a clutch from the engine, when the transmission is in direct drive, that is, when the balking ring clutch is engaged. It will be understood that any suitable provision is made for preventing shifting of the clutch collar 21 when the transmission is in reverse gearing. The shifting mechanism forms no part of this invention.

What we claim is:

1. In a transmission mechanism, inner and outer concentric drive shafts, a driven shaft axially alined therewith, shiftable clutch sections, an operating part common to both and operable in one direction from neutral to shift one of said sections to connect the outer drive shaft to the driven shaft and in the other direction from neutral to operate the other clutch section to clutch the inner drive shaft to the driven shaft, and an indirect reduction drive gearing between the outer drive shaft and the driven shaft including a countershaft, gearing between the outer drive shaft and the countershaft, gearing between the countershaft and the driven shaft including a clutch gear on the driven shaft, a gear concentric with the driven shaft and meshing with a gear on the countershaft and rotatable relatively to the driven shaft and the clutch gear, an overrunning clutch between the concentric gear and the clutch gear including an outer raceway, and a clutch collar normally clutching the outer raceway to the clutch gear.

2. In a transmission mechanism, inner and outer concentric drive shafts, a driven shaft axially alined therewith, shiftable clutch sections, an operating part common to both and operable in one direction from neutral to shift one of said sections to connect the outer drive shaft to the driven shaft and in the other direction from neutral to operate the other clutch section to clutch the inner drive shaft to the driven shaft, and an indirect reduction drive gearing between the outer drive shaft and the driven shaft, including a countershaft, gearing between the outer drive shaft and the countershaft, gearing between the countershaft and the driven shaft including a clutch gear on the driven shaft and rotatable therewith, a gear concentric with the driven shaft and meshing with a gear on the countershaft and rotatable relatively to the driven shaft and the clutch gear, an overrunning clutch between the concentric gear and the clutch gear including an outer raceway, and a clutch collar normally clutching the outer raceway to the clutch gear, the clutch collar being shiftable out of normal position into exclusive engagement with the clutch gear, the clutch collar having gear teeth, a shiftable idler gear for meshing with a gear on the countershaft, the clutch collar being shiftable into exclusive clutching engagement with the clutch gear and the idler into mesh with its countershaft gear when the clutch collar is in exclusive clutching engagement with the clutch gear.

3. In a transmission mechanism, inner and outer concentric drive shafts, a driven shaft axially alined therewith, shiftable clutch sections, an operating part common to both and operable in one direction from neutral to shift one of said sections to connect the outer drive shaft to the driven shaft and in the other direction from neutral to operate the other clutch section to clutch the inner drive shaft directly to the driven shaft, clutch sections on the outer drive shaft and the driven shaft for coacting with said shiftable clutch, an overrunning clutch between the outer drive shaft and said drive clutch section, indirect reduction drive gearing between the outer drive shaft and the driven shaft including an overrunning clutch permitting the driven shaft to overrun the indirect drive when being actuated in a higher gear ratio than the indirect drive, the first overrunning clutch permitting the driven shaft to overrun the outer drive shaft when driven at a higher speed by the inner drive shaft.

4. In a transmission mechanism, inner and outer concentric drive shafts, a driven shaft axially alined therewith, shiftable clutch sections, an operating part common to both and operable in one direction from neutral to shift one of said sections to connect the outer drive shaft to the driven shaft and in the other direction from neutral to operate the other clutch section to clutch the inner drive shaft to the driven shaft, a drive clutch section between the outer drive shaft and the driven shaft for coacting with one of said shiftable clutch sections, a driven clutch section between the inner drive shaft and driven shaft for coacting with said other of said shiftable clutch sections, an overrunning clutch between the outer drive shaft and said drive clutch section, indirect drive gearing between the outer drive shaft and the driven shaft including a countershaft, intermeshing gears on the countershaft and the outer drive shaft, a clutch gear on the driven shaft, intermeshing gears, one being mounted on the countershaft and the other being concentric with the driven shaft, a second overrunning clutch between the gear concentric with the driven shaft and the clutch gear, including an outer raceway having its periphery located adjacent the periphery of the clutch gear, and a clutch collar normally clutching the outer raceway and the clutch gear together and shiftable out of clutching position, the first overrunning clutch permitting the driven shaft to overrun the outer drive shaft when driven at a higher speed by the inner drive shaft and the second overrunning clutch permitting the driven shaft to overrun the indirect countershaft drive.

5. In a transmission mechanism, inner and outer concentric drive shafts, a driven shaft axially alined therewith, shiftable clutch sections, an operating part common to both and operable in one direction from neutral to shift one of said sections to connect the outer drive shaft to the driven shaft and in the other direction from neutral to operate the other clutch section to clutch the inner drive shaft to the driven shaft, a drive clutch section between the outer drive shaft and the driven shaft for coacting with one of said shiftable clutch sections, a driven clutch section between the inner drive shaft and driven shaft for coacting with said other of said shiftable clutch sections, an overrunning clutch between the outer drive shaft and said drive clutch section, indirect drive gearing between the outer drive shaft and the driven shaft including a countershaft, intermeshing gears on the countershaft and the outer drive shaft, a clutch gear on the driven shaft, intermeshing gears, one being mounted on the countershaft and the other being concentric with the driven shaft, a second overrunning clutch between the gear concentric with the driven shaft and the clutch gear, including an outer raceway having its periphery located adjacent the periphery of the clutch gear, and a clutch collar normally clutching the outer raceway and the clutch gear together and shiftable out of clutching position, a reverse gearing including an idler gear meshing with a gear on the countershaft, the clutch collar having gear teeth shiftable into mesh with the idler when the clutch collar is in exclusive engagement with the clutch gear.

6. In a transmission mechanism, axially alined driving and driven shafts, a clutch operable to connect the shafts directly together, an indirect drive between the shafts including a countershaft, gearing between the drive shaft and the countershaft, gearing between the countershaft and the driven shaft including a clutch gear on the driven shaft and rotatable therewith, a gear concentric with the driven shaft and meshing with a gear on the countershaft and rotatable relatively to the driven shaft and the clutch gear, an overrunning clutch between the concentric gear and the clutch gear including an outer raceway, a clutch collar normally clutching the outer raceway to the clutch gear and being shiftable into exclusive clutching engagement with the clutch gear, the clutch collar having gear teeth, an intermediary idler for meshing with a countershaft gear and with the gear teeth of the clutch collar, the idler being normally out of mesh with the companion countershaft gear, the idler and the clutch collar being shiftable to shift the collar into exclusive engagement with the clutch gear and the idler to mesh with its countershaft gear when the collar is in exclusive clutching engagement with the clutch gear.

CARL D. PETERSON.
ALBERT H. DEIMEL.

REFERENCES CITED

The following references are of record in the file of this patent:

UNITED STATES PATENTS

| Number | Name | Date |
|---|---|---|
| 2,258,684 | Lysholm et al. | Oct. 14, 1941 |
| 2,272,434 | Schjolin | Feb. 10, 1942 |
| 2,344,656 | Swennes | Mar. 21, 1944 |